United States Patent
Park et al.

(10) Patent No.: US 9,023,494 B2
(45) Date of Patent: May 5, 2015

(54) RECHARGEABLE BATTERY PACK

(75) Inventors: Kyung-Ho Park, Yongin-si (KR); Seok Koh, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 78 days.

(21) Appl. No.: 13/609,831

(22) Filed: Sep. 11, 2012

(65) Prior Publication Data

US 2013/0130065 A1 May 23, 2013

(30) Foreign Application Priority Data

Nov. 17, 2011 (KR) .................. 10-2011-0120469

(51) Int. Cl.
| | |
|---|---|
| H01M 2/00 | (2006.01) |
| H01M 2/02 | (2006.01) |
| H01M 2/34 | (2006.01) |
| H01M 10/42 | (2006.01) |

(52) U.S. Cl.
CPC .............. *H01M 2/0275* (2013.01); *H01M 2/34* (2013.01); *H01M 10/425* (2013.01)

(58) Field of Classification Search
None
See application file for complete search history.

(56) References Cited

U.S. PATENT DOCUMENTS

| | | | |
|---|---|---|---|
| 6,503,856 B1 * | 1/2003 | Broadway et al. | 442/366 |
| 2002/0094475 A1 * | 7/2002 | Aoyama | 429/99 |
| 2005/0142439 A1 * | 6/2005 | Lee et al. | 429/163 |
| 2008/0081249 A1 * | 4/2008 | Kaneko | 429/121 |
| 2009/0111017 A1 * | 4/2009 | Kim | 429/178 |
| 2011/0086242 A1 * | 4/2011 | Lee | 429/7 |

FOREIGN PATENT DOCUMENTS

| | | |
|---|---|---|
| JP | 2002-100337 A | 4/2002 |
| JP | 2011-040390 A | 2/2011 |

* cited by examiner

*Primary Examiner* — Patrick Ryan
*Assistant Examiner* — Haixia Zhang
(74) *Attorney, Agent, or Firm* — Lee & Morse, P.C.

(57) ABSTRACT

A rechargeable battery pack includes a plurality of unit cells adjacent to each other along a first direction in a pouch, the pouch having a terrace portion at one side surface, and a vertical portion on and perpendicular to the terrace portion, a protection circuit module (PCM) electrically connected to the unit cells, the PCM including a concave groove, and the vertical portion of the pouch fitting into the concave groove, and an adhesion member connecting the PCM and the terrace portion of the pouch, the adhesion member including a separation portion configured to concavely separate and fit the vertical portion of the pouch.

14 Claims, 6 Drawing Sheets

RECHARGEABLE BATTERY PACK

BACKGROUND

1. Field

The described technology relates generally to a rechargeable battery pack. More particularly, the described technology relates to a rechargeable battery pack including a plurality of unit cells in parallel and a protection circuit module over adjacent unit cells.

2. Description of the Related Art

A rechargeable battery pack may be used as a unit cell according to a kind of a device to be used and may be used by electrically connecting unit cells. For example, a rechargeable battery pack may include a unit cell, a protection circuit module (PCM) that protects the unit cell, and a connector that connects the PCM to a device.

A plurality of unit cells may be disposed in parallel to form a rechargeable battery pack in a tablet type. The PCM may be formed to be electrically connected to each of the unit cells of the rechargeable battery pack.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery pack having advantages of reinforcing close adhesion strength between unit cells that are disposed in parallel, reinforcing close adhesion strength between a PCM and a terrace portion, and improving an insulation performance between a PCM and a terrace portion.

An exemplary embodiment provides a rechargeable battery pack, including a plurality of unit cells adjacent to each other along a first direction in a pouch, the pouch having a terrace portion at one side surface, and a vertical portion on and perpendicular to the terrace portion, a protection circuit module (PCM) electrically connected to the unit cells, the PCM including a concave groove, and the vertical portion of the pouch fitting into the concave groove, and an adhesion member connecting the PCM and the terrace portion of the pouch, the adhesion member including a separation portion configured to concavely separate and fit the vertical portion of the pouch.

The pouch may include a first casing material and a second casing material that are thermally fusion-bonded to house electrode assemblies of respective unit cells, lead tabs of respective electrode assemblies being drawn out between the first casing material and the second casing material and being bent over the terrace portion of the pouch to be connected to the PCM on the terrace portion.

The unit cells may be tablet-shaped.

A length of the vertical portion on the terrace portion may be smaller than a total width of the terrace portion, the length of the vertical portion and the width of the terrace portion being measured along a second direction perpendicular to the first direction.

A width of the concave groove is larger than a sum of a width of the vertical portion and two times a thickness of the adhesion member, the widths of the concave groove and vertical portion being measured along the first direction, and the thickness of the adhesion member being measured along a third direction perpendicular to the first and second directions.

The separation portion may separate to have a portion of the adhesion member on each side of two opposite sides of the vertical portion, the separate portions of the adhesion member fitting in the concave groove with the vertical portion.

The adhesion member may include a mesh portion between first and second adhesive layers, the first and second adhesive layers being connected to each other through air gaps in the mesh portion.

The total width of the adhesion member may substantially equal a length of the separation portion and a width of a connection portion, the widths of the adhesion member and connection portion being measured along the second direction, and the length of the separation portion being measured along the second direction, and the connection portion may be adjacent and connected to the separation portion along the second direction, the connection portion having a larger width than the length of the separation portion.

The adhesion member may be a double-sided adhesive tape.

The adhesion member may be between the PCM and the terrace portion, the adhesion member, PCM, and terrace portion being substantially parallel to each other.

The terrace portion may continuously overlap all the unit cells, and one vertical portion is positioned between every two adjacent unit cells to separate therebetween.

A single adhesion member may extend continuously to overlap the entire terrace portion.

The adhesion member may include a connection portion and the separation portion, the connection portion extending continuously to overlap all the unit cells, and the separation portion being a cut extending from the connection portion toward the vertical portion.

The adhesion member may include a connection portion and a separation portion, the connection portion continuously overlapping at least two adjacent unit cells, and the separation portion overlapping substantially only the vertical portion separating the at least two adjacent unit cells.

The vertical portion may fit through the separation portion, portions of the adhesion member separate at the separation portion to have a portion of the adhesion member on each side of the vertical portion.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Korean Patent Application No. 10-2011-0120469, filed on Nov. 17, 2011, in the Korean Intellectual Property Office, and entitled: "Rechargeable Battery Pack," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when an element is referred to as being "on" another element or substrate, it can be directly on the other element or substrate, or intervening elements may also be present. In addition, it will also be understood that when an element is referred to as being "between" two elements, it can be the only element between the two elements, or one or more intervening elements may also be present. Like reference numerals refer to like elements throughout.

Figure 1:
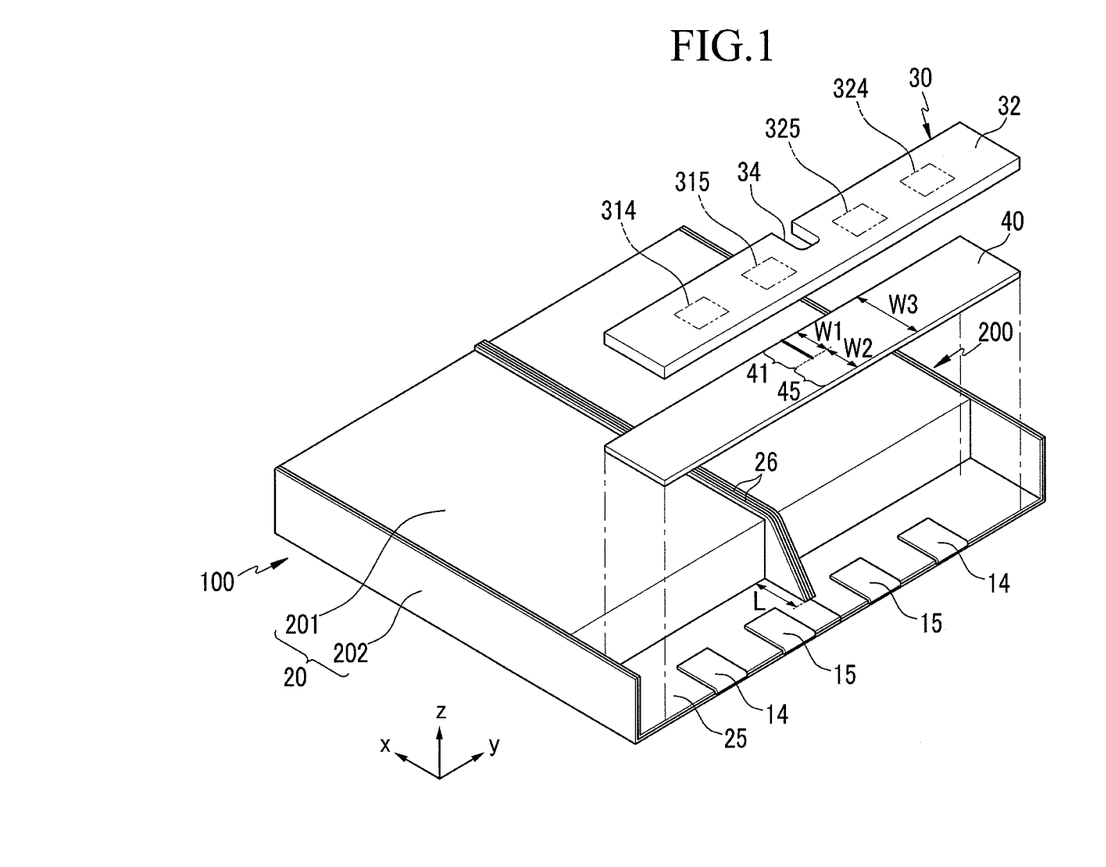
FIG. 1 illustrates an exploded perspective view of a rechargeable battery pack according to a first exemplary embodiment.
Figure 2:
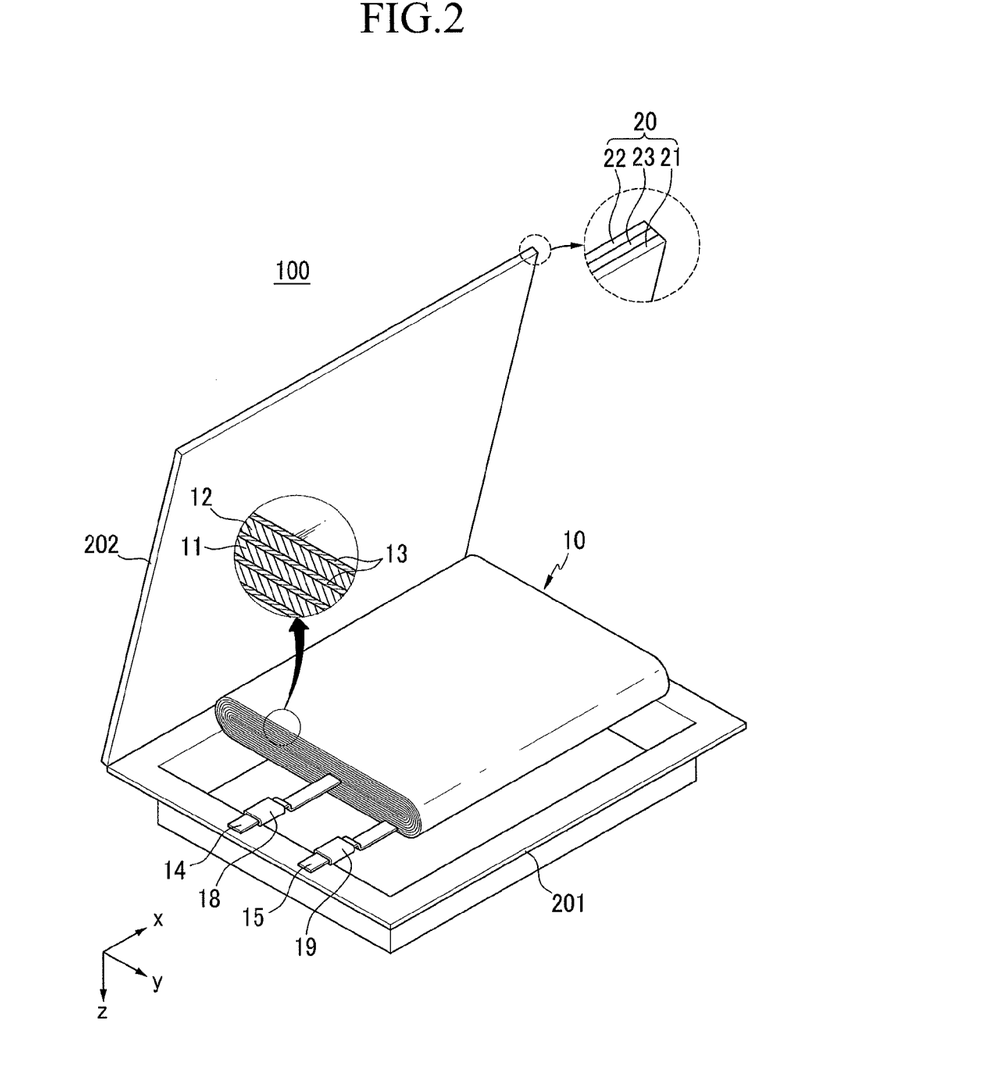
FIG. 2 illustrates an exploded perspective view of an electrode assembly and a pouch in the rechargeable battery pack of FIG. 1.

FIG. 1 is an exploded perspective view of a rechargeable battery pack according to a first exemplary embodiment, and FIG. 2 is an exploded perspective view of an electrode assembly and a pouch in the rechargeable battery pack. Referring to FIGS. 1 and 2, a rechargeable battery pack according to the present exemplary embodiment may be formed by disposing in parallel a plurality of unit cells, e.g., a first unit cell 100 and a second unit cell 200, such that each unit cell includes an electrode assembly 10 in a pouch 20. Further, the rechargeable battery pack may include a PCM 30 that is electrically connected to the unit cells, e.g., to the first and second unit cells 100 and 200, and an adhesion member 40 that attaches the PCM 30 to the pouch 20.

In detail, in order to protect the unit cells 100 and 200 from an overcharge, an over-discharge, an overcurrent, and/or an outside short, the PCM 30 may be formed by mounting protective circuit elements. The PCM 30 may be electrically connected to the unit cells 100 and 200 that are disposed in parallel.

A rechargeable battery pack according to the present exemplary embodiment may have the two unit cells 100 and 200 or more according to a required power configuration of a device. The unit cells 100 and 200 may be identical and, therefore, the rechargeable battery pack will be described with reference to only the first unit cell 100.

For example, as illustrated in FIG. 2, the electrode assembly 10 in the unit cell 100 may be formed in a jelly roll form by disposing and spiral-winding a first electrode 11 (for convenience, referred to as a "positive electrode") and a second electrode 12 (for convenience, referred to as a "negative electrode") with a separator 13 interposed therebetween. The separator 13 may be formed, e.g., of a polymer solid electrolyte film, for passing lithium ions. In another example, the electrode assembly 10 may be formed by stacking a positive electrode and a negative electrode that are formed with single plates with a separator interposed therebetween (not shown). In yet another example, the electrode assembly 10 may include a stacking structure formed by folding a positive electrode, a separator, and a negative electrode in a zigzag method (not shown).

Figure 3:
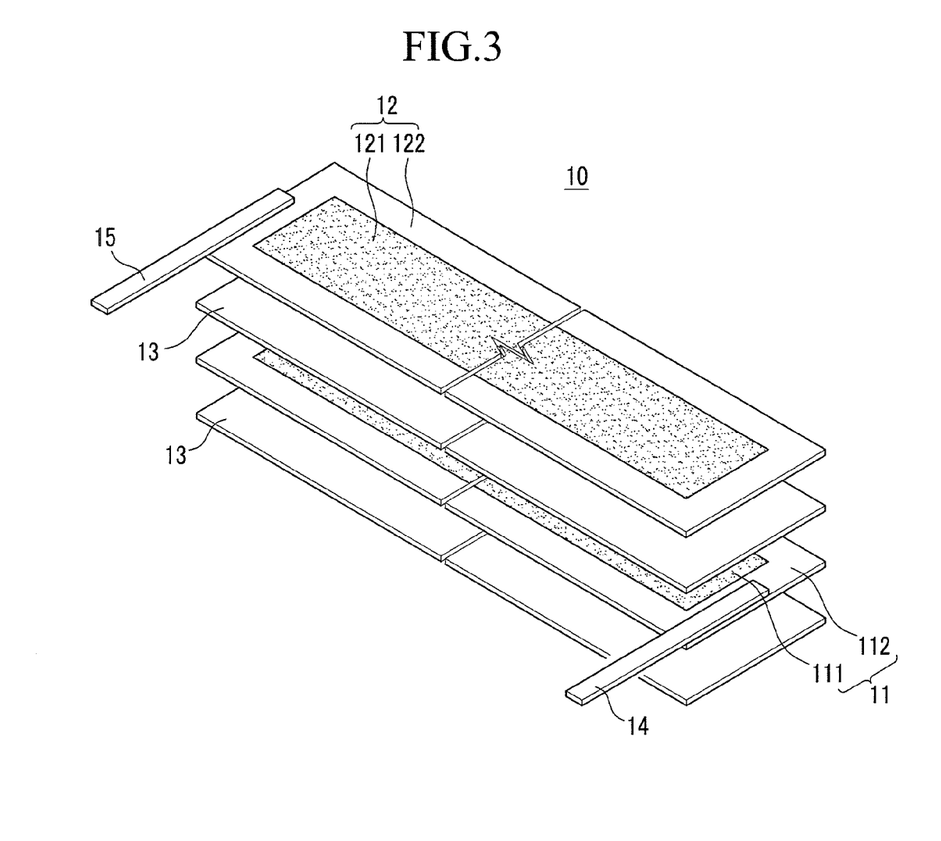
FIG. 3 illustrates an exploded perspective view of the electrode assembly in FIG. 2.

FIG. 3 is an exploded perspective view of the electrode assembly 10. Referring to FIG. 3, the positive electrode 11 may include a coating region 111 that applies an active material to a current collector of a metal thin film and an uncoated region 112 that does not apply an active material to be set as an exposing region of a current collector. A first lead tab 14 (for convenience, referred to as a "positive electrode lead tab") may be connected to the uncoated region 112 of the positive electrode 11.

The negative electrode 12 may include a coating region 121 that applies an active material different from an active material of the positive electrode 11 to a current collector of a metal thin film and an uncoated region 122 that does not apply an active material to be set as an exposing region of a current collector. A second lead tab 15 (for convenience, referred to as a "negative electrode lead tab") may be connected to the uncoated region 122 of the negative electrode 12 at the side opposite to the positive electrode lead tab 14. The positive electrode lead tab 14 and the negative electrode lead tab 15 may be drawn out, e.g., along a same direction in the x-axis or along different directions in the x-axis.

Referring again to FIG. 2, the pouch 20 may be formed in a multi-layered sheet structure that encloses the outside of the electrode assembly 10. For example, the pouch 20 may include a polymer sheet 21, i.e., that forms an inner surface and that performs insulation and thermal fusion-bonding, a nylon sheet 22, i.e., a polyethyleneterephthalate (PET) sheet, a nylon sheet, or a PET-nylon complex sheet that forms an outer appearance and that performs a protection operation, and a metal sheet 23, i.e., that provides mechanical strength. The metal sheet 23 may be interposed between the polymer sheet 21 and the nylon sheet 22, and may be formed of, e.g., an aluminum sheet.

Further, referring to FIGS. 1 and 2, the pouch 20 may include a first casing material 201 that houses the electrode assembly 10 and a second casing material 202 that covers the electrode assembly 10 and that is thermally fusion-bonded to the first casing material 201 at the outside of the electrode assembly 10. The first and second casing materials 201 and 202 may be formed of the polymer sheet 21, the nylon sheet 22, and the metal sheet 23 of the same structure.

For example, the first casing material 201 may be formed in a concave structure to house the electrode assembly 10, and the second casing material 202 may be flatly formed to cover the electrode assembly 10 that is housed in the first casing material 201. For example, the electrode assembly 10 may be formed in a tablet type, so the pouch 20 may have a cuboid shape to house the table-type electrode assembly 10. The unit cell 100 may be formed by enclosing the electrode assembly 10 with the pouch 20.

The positive electrode lead tab 14 and the negative electrode lead tab 15 may be drawn out of the electrode assembly 10 to the outside of the pouch 20, and may be physically and electrically connected to the outside, e.g., an pouter surface of, the thermally fusion-bonded pouch 20. That is, the positive electrode lead tab 14 and the negative electrode lead tab 15 may be disposed to penetrate between the first and second casing materials 201 and 202 that are thermally fusion-bonded in a terrace portion 25 that is formed at one side surface (yz-plane) of the pouch 20. In other words, as illustrated in FIG. 1, the positive and negative electrode lead tabs 14 and 15 may extend between the first and second casing materials 201 and 202 to be folded toward and contact an outer surface of the first casing material 201 that defines the terrace portion 25. In this case, the positive electrode lead tab 14 and the negative electrode lead tab 15 may be electrically insulated from the pouch 20 by insulation members 18 and 19, respectively (see FIGS. 2 and 5).

Further, the terrace portion 25 may be formed by thermally fusion-bonding an end portion of the first casing material 201 that is bent along the electrode assembly 10 at the drawn-out side of the positive electrode lead tab 14 and the negative electrode lead tab 15 to a flat bottom surface of the second casing material 202 opposite thereto. In other words, the second casing material 202 may be substantially flat and the first casing material 201 may have a first casing part, e.g., a cuboid-shaped part with an open face attached to the second casing material 202 to define an enclosed space therebetween for the battery assembly 10, and a second part, i.e., a substantially flat part extending, e.g., perpendicularly, from an edge of the first part to extend along and be substantially flash with a portion of the second casing material 202. As such, the second part of the first casing material 201 defines a step structure relative to the first part of the first casing material 201. The second part of the first casing material 201 may also be referred to as the terrace portion 25.

The negative electrode lead tab 15 may be directly connected to the PCM 30, and the positive electrode lead tab 14 may be connected to the PCM 30 by interposing a resistor element (not shown) having a positive temperature coefficient. When a temperature level of the unit cells 100 and 200 arrives at a setting point, the resistor element intercepts a current on the positive electrode lead tab 14. For convenience, in the present exemplary embodiment, a resistor element is omitted from the figures.

Figure 4:
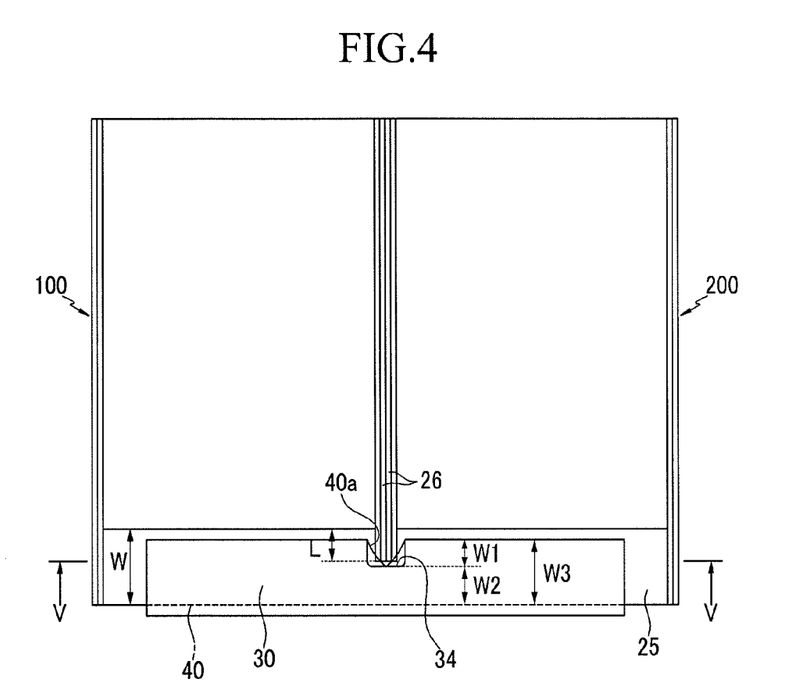
FIG. 4 illustrates a top plan view of the rechargeable battery pack of FIG. 1.
Figure 5:
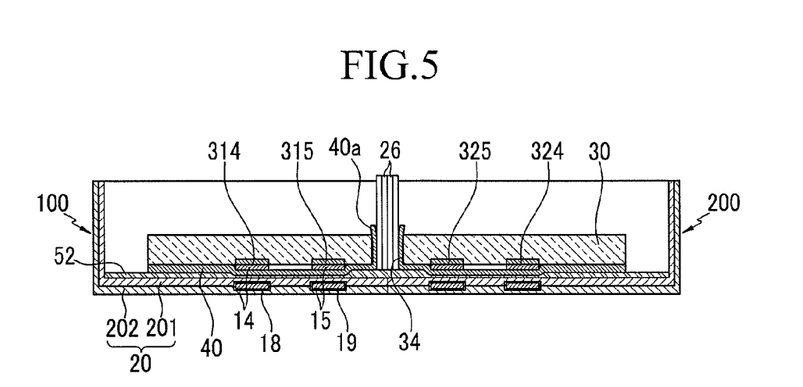
FIG. 5 illustrates a cross-sectional view along line V-V of FIG. 4.

FIG. 4 is a top plan view of the rechargeable battery pack of FIG. 1, and FIG. 5 is a cross-sectional view of the rechargeable battery pack taken along line V-V of FIG. 4. Referring to FIGS. 1, 4, and 5, the PCM 30 may be attached to the terrace portion 25 by the adhesion member 40.

The terrace portion 25 may include an adjacent vertical portion 26 between a terrace portion 25 of one side unit cell 100 and a terrace portion 25 of the other side unit cell 200 among adjacent unit cells 100 and 200. That is, the pouch 20 may have a vertical portion in at least one end portion of the terrace portion 25 and may have a vertical portion at both end portions of the terrace portion 25, as in the present exemplary embodiment. For example, a size of the pouch 20 may be adjusted to contain the plurality of unit cells 100 and 200, i.e., a single pouch 20 may be used for a plurality of unit cells, so the vertical portion 26 may separate between electrode assemblies 10 of the adjacent unit cells 100 and 200 in the pouch 20. For example, the vertical portion 26 may extend along an entire length of a battery assembly 10, e.g., along the x-axis, and may further extend along at least a portion of the terrace portion 25, e.g., along the x-axis.

The adjacent vertical portion 26 (hereinafter, referred to as a "vertical portion") among vertical portions may extend to a length L along the x-axis in the terrace portion 25, as illustrated in FIGS. 1 and 4, while a width W of the terrace portion 25 in the x-axis may be larger than the length L. A portion of the width W of the terrace portion 25 not including the vertical portion 26 may be substantially flat.

As illustrated in FIG. 1, the PCM 30 may include a concave groove 34 to correspond to the vertical portion 26. Therefore, the PCM 30 may be attached to a plane of the terrace portion 25 by the adhesion member 40 in a state of housing the vertical portion 26 in the concave groove 34, as illustrated in FIGS. 4-5.

An insulation tape 52, as illustrated in FIG. 5, may be further provided between a plane of the terrace portion 25 and the adhesion member 40 to electrically insulate the PCM 30 and the pouch 20. In this case, the positive electrode lead tab 14 and the negative electrode lead tab 15 of one side unit cell 100 may be electrically connected to connection portions 314 and 315 of the PCM 30, and the other side unit cell 200 may be electrically connected to connection portions 324 and 325 of the PCM 30. The PCMs 30 may be connected to each other in a circuit, and may connect the unit cells 100 and 200 in series or in parallel.

The adhesion member 40 may have a separation portion 41 that is separated (e.g., cut) to correspond to the vertical portion 26. That is, as illustrated in FIG. 1, the separation portion 41 may be a partial tear in the adhesion member 40 that extends along the x-axis to a predetermined length smaller than a width W3 of the adhesion member 40, so a remaining portion of the adhesion member 40 between an edge of the separation portion 41 and an edge of the adhesion member 40 along the x-axis may be a connection portion 45. A location of the separation portion 41 along the y-axis corresponds to the vertical portion 26. As such, when the adhesion member 40 is positioned on the terrace portion 25, the vertical portion 26 extends through the separation portion 41.

In other words, as illustrated in FIGS. 4-5, portions 40a of the adhesion member 40 may be pushed apart from each other at the separation portion 41 by the vertical portion 26, e.g., like curtains, to facilitate positioning of the adhesion member 40 on the terrace portion 25. Accordingly, the adhesion member 40 may be attached to the terrace portion 25 at both sides of the vertical portion 26, while tops of portions 40a may deviate from the vertical portion 26. That is, the separation portion 41 removes interference of the adhesion member 40 and the vertical portion 26, while the connection portion 45 connects between portions of the adhesion member 40 corresponding to adjacent cell units. As such, a single adhesion member 40 may be used to attach the PCM 30, i.e., via the connection portion 45 extending along a plurality of unit cells, to a plurality of corresponding cell units, thereby increasing adhesion and stability of the adjacent cell units. For example, a single PCM 30 may attached to the plurality of unit cells or a plurality of PCMs 30 may be attached to respective unit cells via a single adhesion member 40.

Figure 6:
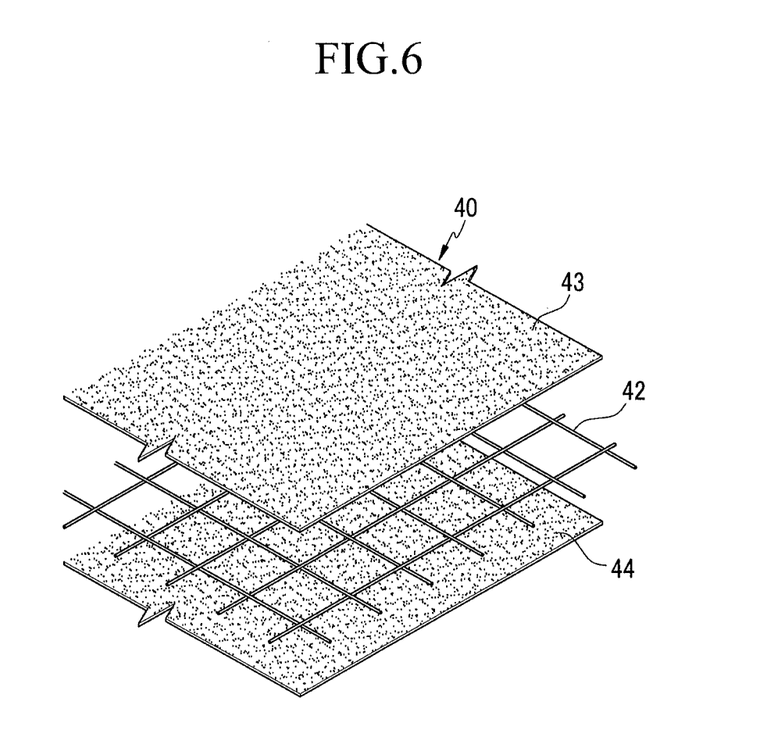
FIG. 6 illustrates an exploded perspective view of an adhesion member.

FIG. 6 is an exploded perspective view of the adhesion member 40. Referring to FIG. 6, the adhesion member 40 may include a mesh portion 42 that provides tensile strength, a first adhesive layer 43, and a second adhesive layer 44. The first and second adhesive layers 43 and 44 are provided in an upper portion and a lower portion of the mesh portion 42, i.e., the mesh portion 42 may be between the first and second adhesive layers 43 and 44. For example, the adhesion member 40 may be formed with a double-sided adhesive tape.

The mesh portion 42 may be partially cut from the separation portion 41 corresponding to the vertical portion 26, and the remaining portions of the mesh portion 42 may be connected to the separation portion 41. Thus, the mesh portion 42 may provide close adhesion strength (strength of a Y-axis direction in FIG. 4) to the unit cells 100 and 200 that are disposed in parallel.

The first and second adhesive layers 43 and 44 may be integrally connected through air gaps, i.e., gaps defined by the mesh structure of the mesh portion 42, in the mesh portion 42, and may provide adhesion strength between the PCM 30 and the terrace portion 25. That is, the adhesion member 40 forms a structure in which the mesh portion 42 is embedded within, e.g., between, the first and second adhesive layers 43 and 44.

Referring again to FIGS. 1 and 4, the adhesion member 40 may have the width W3 along the x-axis. A sum of a tear width W1 of the separation portion 41 and a connection width W2 of a connection portion 45 may equal the width W3, as illustrated in FIGS. 1 and 4. The connection portion 45 is connected to the separation portion 41 and refers to a portion of the adhesion member 40 adjacent the separation portion 41 in the x-axis. The width W3 of the adhesion member 40 may be smaller than a width W of the terrace portion 25 and may enable easy attachment of the adhesion member 40 to the terrace portion 25. For example, the width W3 of the adhesion member 40 may have a same width as or shorter than the PCM 30 along the x-axis, and the PCM 30 may extend beyond an edge of the terrace portion 25 along the x-axis, as illustrated in FIG. 4.

In the adhesion member 40, the connection width W2 of the connection portion 45 may be larger than the tear width W1 of the separation portion 41 to ensure stability. As such, even when forming the separation portion 41, deterioration of close adhesion strength of the unit cells 100 and 200 may be minimized by the adhesion member 40.

Figure 7:
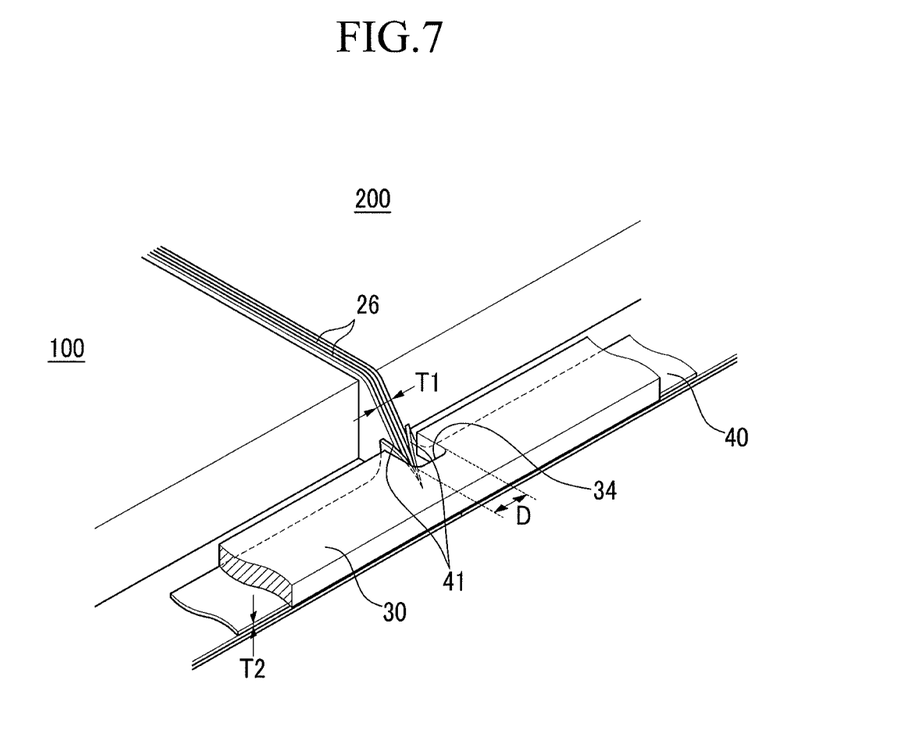
FIG. 7 illustrates a perspective view of a PCM attached to a terrace portion by an adhesion member.

Referring to FIG. 7, in the PCM 30, an inside gap D of the concave groove 34 may be formed larger than a sum of a thickness T1 of the vertical portion 26 and two times a thickness T2 of the adhesion member 40. In other words, D>T1+2·T2.

Therefore, the separation portion 41 of the adhesion member 40 may be spread to both sides of the vertical portion 26 to be housed into the concave groove 34. As the separation portion 41 is drawn out to both sides of the vertical portion 26, the bent separation portion 41 may be housed to the inside of the concave groove 34, thereby preventing deterioration of a close contacting property between the PCM 30 and the terrace portion 25 by the adhesion member 40.

A rechargeable battery pack according to an exemplary embodiment may include a separation portion in an adhesion member. As such, parts of the adhesion member may separate at the separation portion to flank an adjacent vertical portion protruding through the separation portion while partially deviating from the adjacent vertical portion. Therefore, a PCM may be attached to a terrace portion through the adhesion member. As interference between the adjacent vertical portion and adhesion member may be substantially minimized by the separation portion, the adhesion member may form and reinforce close adhesion strength between adjacent unit cells that are disposed in parallel through a connection portion.

Further, in a rechargeable battery pack according to an exemplary embodiment, because a separation portion of an adhesion member and a concave groove of a PCM deviate from an adjacent vertical portion, close adhesion strength and insulation performance between the PCM and the terrace portion by the adhesion member may be improved.

In contrast, in a conventional rechargeable battery pack, e.g., a battery pack without an adhesion member with a separation portion, a separate double-sided adhesive member is used to connect a PCM to each unit cell. As such, close adhesion strength between adjacent unit cells that are disposed in parallel may be reduced, close adhesion strength between the terrace portion and the PCM may be deteriorated, and an electrical insulation performance may be weakened.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

<Description of symbols>

| | |
|---|---|
| 10: electrode assembly | 11: first electrode (positive electrode) |
| 12: second electrode (negative electrode) | |
| 13: separator | |
| 14: first (positive electrode) lead tab | |
| 15: second (negative electrode) lead tab | |
| 18, 19: insulation member | 20: pouch |
| 21: polymer sheet | 22: nylon sheet |
| 23: metal sheet | 25: terrace portion |
| 26: adjacent vertical portion | 30: protection circuit module (PCM) |
| 34: concave groove | 40: adhesion member |
| 41: separation portion | 42: mesh portion |
| 43, 44: first and second adhesive layers | |
| 45: connection portion | |
| 52: insulation tape | 100, 200: unit cell |
| 111, 121: coating region | 112, 122: uncoated region |
| 201, 202: first and second casing materials | |
| 314, 315, 324, 325: connection portion | |
| D: inside gap | L: length |
| T1: thickness of vertical portion | T2: thickness of adhesion member |
| W: width of terrace portion | W1: tear width |
| W2: connection width | W3: width of adhesion member |

What is claimed is:

1. A rechargeable battery pack, comprising:
    a plurality of unit cells adjacent to each other along a first direction in a pouch, the pouch including:
        a terrace portion at one side surface, and
        a vertical portion on and perpendicular to the terrace portion;
    a protection circuit module (PCM) electrically connected to the unit cells, the PCM including a concave groove, and the vertical portion of the pouch fitting into the concave groove; and
    an adhesion member connecting the PCM and the terrace portion of the pouch, the adhesion member including a separation portion concavely separable at the vertical portion of the pouch,
    wherein portions of the adhesion member separate at the separation portion to have a portion of the adhesion member on each side of the vertical portion, the vertical portion fits through the separation portion to be between the separate portions of the adhesion member and to extend above the separate portions of the adhesion member.

2. The rechargeable battery pack as claimed in claim 1, wherein the pouch includes a first casing material and a second casing material that are thermally fusion-bonded to house electrode assemblies of respective unit cells, lead tabs of respective electrode assemblies being drawn out between the first casing material and the second casing material and being bent over the terrace portion of the pouch to be connected to the PCM on the terrace portion.

3. The rechargeable battery pack as claimed in claim 1, wherein the unit cells are tablet-shaped.

4. The rechargeable battery pack as claimed in claim 1, wherein a length of the vertical portion on the terrace portion is smaller than a total width of the terrace portion, the length of the vertical portion and the width of the terrace portion being measured along a second direction perpendicular to the first direction.

5. The rechargeable battery pack as claimed in claim 4, wherein a width of the concave groove is larger than a sum of a width of the vertical portion and two times a thickness of the adhesion member, the widths of the concave groove and vertical portion being measured along the first direction, and the thickness of the adhesion member being measured along a third direction perpendicular to the first and second directions.

6. The rechargeable battery pack as claimed in claim 4, wherein the separation portion separates to have a portion of the adhesion member on each side of two opposite sides of the vertical portion, the separate portions of the adhesion member fitting in the concave groove with the vertical portion.

7. The rechargeable battery pack as claimed in claim 6, wherein the adhesion member includes a mesh portion between first and second adhesive layers, the first and second adhesive layers being connected to each other through air gaps in the mesh portion.

8. The rechargeable battery pack as claimed in claim 4, wherein:
   the total width of the adhesion member substantially equals a length of the separation portion and a width of a connection portion, the widths of the adhesion member and connection portion being measured along the second direction, and the length of the separation portion being measured along the second direction, and
   the connection portion being adjacent and connected to the separation portion along the second direction, the connection portion having a larger width than the length of the separation portion.

9. The rechargeable battery pack as claimed in claim 1, wherein the adhesion member is a double-sided adhesive tape.

10. The rechargeable battery pack as claimed in claim 1, wherein the adhesion member is between the PCM and the terrace portion, the adhesion member, PCM, and terrace portion being substantially parallel to each other.

11. The rechargeable battery pack as claimed in claim 1, wherein the terrace portion continuously overlaps all the unit cells, and one vertical portion is positioned between every two adjacent unit cells to separate therebetween.

12. The rechargeable battery pack as claimed in claim 11, wherein a single adhesion member extends continuously to overlap the entire terrace portion.

13. The rechargeable battery pack as claimed in claim 11, wherein the adhesion member includes a connection portion and the separation portion, the connection portion extending continuously to overlap all the unit cells, and the separation portion being a cut extending from the connection portion toward the vertical portion.

14. The rechargeable battery pack as claimed in claim 1, wherein the adhesion member includes a connection portion and a separation portion, the connection portion continuously overlapping at least two adjacent unit cells, and the separation portion overlapping substantially only the vertical portion separating the at least two adjacent unit cells.

* * * * *